US007013155B1

(12) United States Patent
Ruf et al.

(10) Patent No.: US 7,013,155 B1
(45) Date of Patent: Mar. 14, 2006

(54) DELIVERY OF AN INSTANT VOICE MESSAGE IN A WIRELESS NETWORK USING THE SMS PROTOCOL

(75) Inventors: Michael P. Ruf, Parkland, FL (US); Sani El-Fishawy, Woodside, CA (US)

(73) Assignee: Core Mobility, Inc., Mountain View, CA (US)

( * ) Notice: Subject to any disclaimer, the term of this patent is extended or adjusted under 35 U.S.C. 154(b) by 377 days.

(21) Appl. No.: 10/407,955

(22) Filed: Apr. 3, 2003

(51) Int. Cl.
*H04Q 7/20* (2006.01)

(52) U.S. Cl. ............... 455/466; 455/412.1; 455/412.2; 379/88.11; 379/88.12; 379/88.13

(58) Field of Classification Search ............... 379/67.1, 379/88.11, 88.12, 88.13, 88.18, 88.25, 88.26; 455/412.1, 412.2, 466
See application file for complete search history.

(56) References Cited

U.S. PATENT DOCUMENTS

| | | | |
|---|---|---|---|
| 4,856,066 A | | 8/1989 | Lemelson |
| 5,146,487 A | * | 9/1992 | Bergsman et al. ........ 379/88.24 |
| 5,675,507 A | * | 10/1997 | Bobo, II ..................... 709/206 |
| 5,751,791 A | * | 5/1998 | Chen et al. ............... 379/88.13 |
| 5,781,614 A | | 7/1998 | Brunson |
| 5,905,774 A | | 5/1999 | Tatchell |
| 5,951,638 A | | 9/1999 | Hoss et al. |
| 5,974,449 A | | 10/1999 | Chang et al. |
| 6,038,296 A | | 3/2000 | Brunson et al. |
| 6,075,844 A | | 6/2000 | Goldberg et al. |
| 6,097,941 A | | 8/2000 | Helferich |
| 6,144,644 A | * | 11/2000 | Bajzath et al. ............... 370/259 |
| 6,198,808 B1 | | 3/2001 | Martin |
| 6,233,318 B1 | | 5/2001 | Picard et al. |
| 6,282,270 B1 | | 8/2001 | Porter |
| 6,418,307 B1 | * | 7/2002 | Amin ........................ 455/413 |
| 6,438,217 B1 | | 8/2002 | Huna |
| 6,630,883 B1 | * | 10/2003 | Amin et al. ................ 340/7.29 |
| 6,636,733 B1 | * | 10/2003 | Helferich .................. 455/412.2 |
| 6,731,926 B1 | * | 5/2004 | Link et al. ................ 455/412.2 |
| 6,865,259 B1 | * | 3/2005 | Shaffer et al. ............. 379/88.12 |

\* cited by examiner

*Primary Examiner*—Bing Q. Bui
(74) *Attorney, Agent, or Firm*—Workman Nydegger

(57) ABSTRACT

A sender can create and send a message that can be delivered to recipients with SMS-enabled wireless stations regardless of the other communication capabilities of the wireless stations and the network or network service providers of the recipients. The sender creates a voice message and sends the message to a message server, which stores the message in an interactive voice response (IVR) system. An SMS notification is sent to the recipient and includes instructions for accessing the voice message from the IVR system. The recipient views the SMS notification and accesses the IVR system. After entering a password or otherwise authenticating the recipient or the recipient wireless station, the recipient retrieves the message from the IVR system. If it is not known whether the recipient has an SMS-enabled wireless station, the message server initiates attempts to send SMS notifications using multiple SMS message generation mechanisms.

35 Claims, 4 Drawing Sheets

DELIVERY OF AN INSTANT VOICE MESSAGE IN A WIRELESS NETWORK USING THE SMS PROTOCOL

BACKGROUND OF THE INVENTION

1. The Field of the Invention

The present invention relates to the delivery of voice messages in wireless networks. More specifically, the present invention is directed to recording and sending an instant voice message from a wireless station to one or more recipient wireless stations utilizing the Short Message Service (SMS) protocol to permit delivery of the message regardless of the communication capabilities of the recipient wireless stations.

2. The Relevant Technology

The popularity of all types of mobile telephones is undeniable. People want or need to communicate using voice while they are mobile. At the same time, the use of text messaging is also rising such that virtually any mobile phone on a 2G or 3G network can receive a Short Message Service (SMS) message. While text messaging using protocols such as SMS are somewhat popular, voice is still the preferred way to communicate when using a mobile telephone, since using a telephone keypad to input and send text messages can be very cumbersome and time consuming. Voice messages are more convenient because they can be easily created and they take advantage of the native ability of mobile telephones to receive and output audio data.

Conventional voicemail systems provide the capability for anyone to leave a voicemail message after a telephone call has failed to reach the intended recipient. Using a conventional voicemail system to deliver a voice message to the recipient, a sender first must dial the recipient's telephone number in an attempt to reach the recipient "live" and then fail to do so, whereupon the voicemail system intercedes to allow a voice message to be recorded. In many cases, callers hoping to be able to leave a non-intrusive voice message instead interrupt the intended recipient by making a live telephone call. Conventional voicemail systems represent a convenient adjunct to direct telephone communication between a caller and a recipient, but do not allow voice messages to be created and sent by senders without first making an attempt to establish a live telephone conversation with the recipient.

Another technology, Multimedia Messaging System (MMS), allows senders with MMS-enabled devices to send voice messages to other MMS-enabled devices. However, the proliferation of MMS-compatible devices has been and continues to be very slow. It is likely that MMS-compatible devices will not be widely accepted by consumers until MMS users can reliably send MMS messages to a large number of potential recipients. The problem, of course, is that the large number of potential MMS recipients will not exist until MMS-compatible devices have already been widely accepted by consumers. Another option for sending MMS-based voice messages involves sending the messages to a website where they can be retrieved by the recipients. While this alternative may be occasionally acceptable, the use of a web browser to retrieve a voice message is inconvenient for the recipient when he does not have access to a web browser and is cumbersome compared to the use of telephones to access voice messages.

The foregoing technologies have introduced the convenience of voice messaging to large numbers of users. However, none of these techniques permit a sender to create a voice message at a time of the sender's choosing and to initiate transmission of the voice message to a selected recipient, regardless of the communication capabilities of the telephone that is used by the recipient.

SUMMARY OF THE INVENTION

The present invention is directed to systems and methods for enabling voice messages to be created by a sender and to be delivered to one or more selected recipients of SMS-enabled recipient devices, regardless of the other communication capabilities of the recipient devices. According to the invention, the sender creates an instant voice message at a time selected by the sender and initiates delivery of the voice message to the wireless station of the recipient. The voice messages can be initiated without requiring the sender to first attempt to place a live telephone call to the recipient. Moreover, the voice messages can be delivered according to the invention to substantially any mobile telephones in use today without requiring the recipient telephones to have any specific voice messaging capabilities and regardless of the networks or network service providers associated with the recipient telephones. Thus, the present invention embraces both new and legacy wireless stations and permits users to easily record and transmit instant voice messages to substantially any recipients.

According to the invention, a sender records a message onto his wireless station by pressing one button and choosing the target recipient, either by manually inputting a telephone number or by choosing the intended recipient from a contact list resident on the wireless station. Upon completion of recording the voice message, the sender indicates to the wireless station that the message should be sent. If the sender has a network connection, he indicates to the wireless station to send the message and the message is sent over the network to a message server, which then directs the message to an interactive voice response (IVR) system. If the sender does not have a network connection, the voice message is stored on the wireless station until such time as a network connection is resumed, at which point the message is sent to the message server without any further intervention by the sender. Once the message server has forwarded the voice message to the IVR system, the message server communicates with one or more Short Message Service Controllers (SMSC), or SMS gateways, causing the SMSC to initiate sending an SMS message that contains an embedded phone number for accessing the IVR system. The SMS message may also include information pertaining to the message such as a sender identifier, subject, time of creation, and location of sender. The SMS message is sent to the recipient and appears on the recipient's wireless station along with an optional audio alert indicating arrival of the SMS message. The alert can be audible, visual, tactile, or any combination of thereof. In another embodiment of the invention, a sender may call the IVR system directly from any telephony device, and record and address a voice message to a recipient. Upon completion of recording the voice message, the IVR system communicates with one or more Short Message Service Controllers (SMSC), or SMS gateways to initiate transmission of an SMS message to the recipient.

Once the recipient has been alerted by the SMS message to the arrival of the voice message, the recipient can access the message at his convenience using his wireless station. Depending on the particular capabilities of the wireless station, the recipient will press one or more keys on the wireless station keypad or soft buttons on a touch screen which will cause the wireless station to automatically dial the IVR system. If the IVR system is able to capture the Mobile Directory Number (MDN) or "calling party identifier" of the recipient's wireless station, the IVR system responds by authenticating the recipient for access to the voice message. If the IVR system is unable to capture the MDN or "calling party identifier" of the recipient's telephone, it prompts the recipient to input the telephone number of his wireless station for authentication. Once authenticated, the recipient follows the instructions of the IVR system automated attendant to manage received voice messages. Voice message management activities may include, for example, play, replay, reply to, save and delete.

Another feature of the invention is the ability of the system to learn whether a target telephone associated with a target phone number is able to receive an SMS message. When a sender inputs a phone number into the contact list resident on the sender's wireless station, the system automatically and transparently to the sender checks the phone number to determine if it is capable of receiving an SMS message. If the phone number is capable of receiving an SMS message, the system tags the phone number accordingly in the database and updates the sender's contact list with a visual indicator to denote an SMS-enabled phone number. If the telephone associated with a specified phone number is not able to receive SMS messages, the system logs this information as well and updates the sender's contact list to indicate the same. In this way, the sender will not make the mistake of recording an instant voice message and addressing it to a phone number that is not SMS-enabled. If the sender records an instant voice message and manually addresses it to a new phone number that has not been checked previously, the message server proceeds to communicate with one or more SMSCs or SMS gateways in an attempt to direct the SMSC or SMS gateway to send an SMS message to the recipient. The message server then waits for an indication back from the SMSC or SMS gateway that the recipient's phone number has been recognized and accepted. If the phone number is accepted by the SMSC or SMS gateway, the message server logs information about the successful acceptance of the phone number and updates the sender's contact list accordingly. Similarly, if the SMSC or SMS gateway does not accept the phone number, it logs information into the associated database that the phone number is not able to receive SMS messages, and issues an error message to the sender.

In this manner, the present invention enables users to create voice messages and initiate delivery thereof to recipients that have SMS-enabled wireless devices regardless of the other communication capabilities of the recipient devices. Thus, voice messages can be transmitted to a large segment of the public and do not require senders and recipients to use mobile telephones that are MMS-enabled or have other dedicated voice or multimedia messaging capabilities. Moreover, the instant voice messaging systems of the invention represent a new form of telecommunication that does not require senders to first make an unsuccessful attempt to establish a live telephone conversation with the intended recipient.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for delivering a voice message to an SMS-enabled recipient wireless station regardless of the other communication capabilities of the recipient wireless station. Voice messages are made available according to the invention by storing the voice messages in an IVR system and sending SMS notifications to the recipient wireless stations with instructions for accessing the voice messages stored in the IVR system. In this manner, voice messages can be conveniently created and sent to recipient with new or legacy wireless stations.

Figure 1:
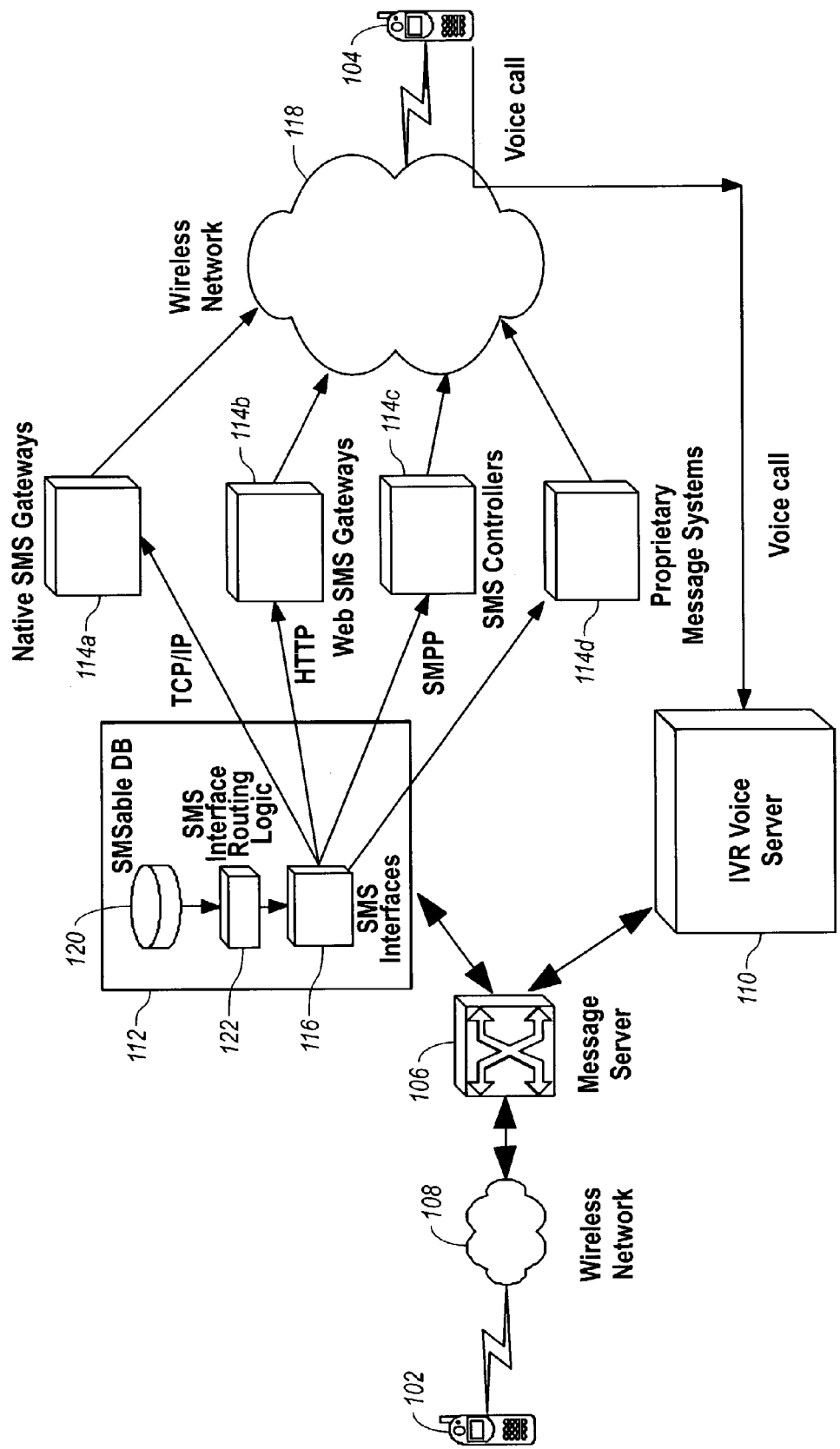
FIG. 1 is a block diagram illustrating a wireless network in which the voice messaging systems of the invention can be practiced.

FIG. 1 is a block diagram illustrating an example of a wireless communication system in which the invention can be practiced. Wireless communication system 100 includes a sender device 102 that is used to create and transmit a voice message that is addressed to a recipient wireless station 104. Sender device 102 can be a wireless or mobile telephone, a conventional wired telephone, or any other telephony device. In general, sender device 102 can be any device that is capable of receiving and capturing audio data that forms the body of the voice message and addressing information that identifies the recipient or the recipient wireless station 104 associated with the recipient. Instead of being a dedicated telephony device, sender device 102 can also be a personal computer or other computing devices having the foregoing capabilities.

In the embodiment of FIG. 1, sender device 102 communicates with a message server 106 using wireless network 108. In general, however, sender device 102 can communicate with message server 106 using any suitable communication network or mechanism, another example of which is the Public Switched Telephone Network (PSTN). Message server 106 is a computer system that routes the voice message and performs the other operations described herein. It should be understood that the invention can be implemented in many types of network environments and various network architectures are applicable. In one embodiment, the message server 106 and the associated SMS blade 112 reside in a wireless operator's network infrastructure. In another embodiment, the message server 106 and the SMS blade 112 reside outside the domain of a wireless operator's infrastructure, and may be hosted, for example, by an independent hosting entity, such as an application service provider. Alternately, the message server 106 and the associated SMS blade 112 can reside behind a corporate firewall.

Figure 3:
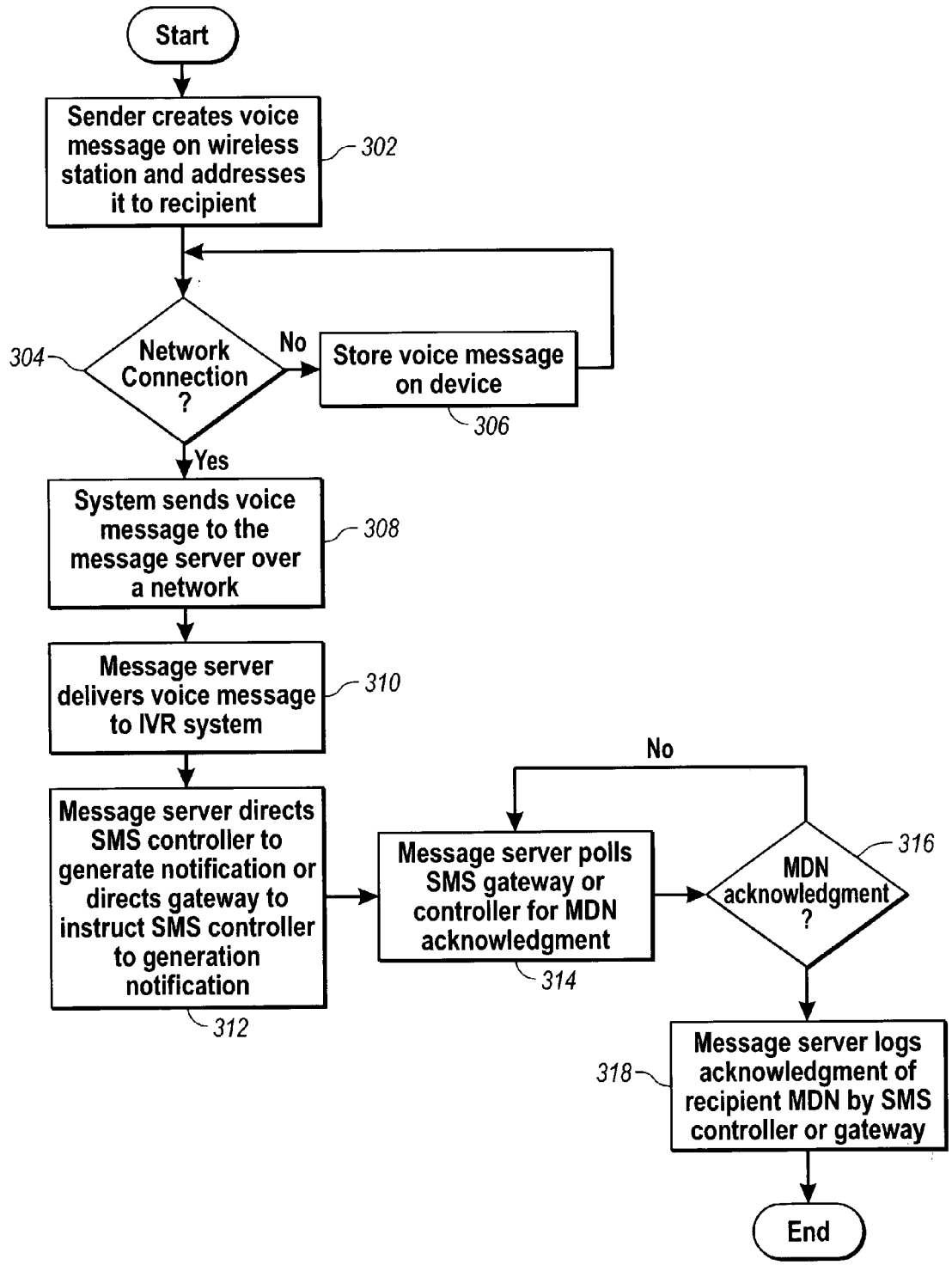
FIG. 3 is a flow diagram illustrating the method of initiating delivery of a voice message to a designated recipient.

An embodiment of the methods for creating and initiating transmission of a voice message is now described in reference to FIGS. 1 and 3. In step 302 of FIG. 3, a sender creates a voice message on the wireless station or other telephony device of the sender and addresses it to the recipient that uses recipient wireless station 104. In general, the voice messages of the invention are created using a dedicated voice messaging process that does not rely on first unsuccessfully attempting to establish a live telephone call with the intended recipient, as has been required in order to use conventional voice mail systems. As used herein, the terms "instant voice messaging" and "instant voice messages" refer to voice messaging that does not require the use of conventional voice mail systems in which the sender must first make an unsuccessful attempt to establish a live telephone call with the recipient. Instead, senders using an instant voice messaging system can cause an instant voice message to be created and sent to the recipient at a time of the sender's choosing.

Although the voice message that are delivered according to the invention can be created at the sender device 102 using any of a variety of possible user interfaces and procedures, one embodiment of the invention employs a method whereby the sender is required to press a button on sender device 102 only once or twice. For instance, the process of composing and transmitting an instant voice message can begin by the sender pressing a designated button on the sender device 102. In response to the button input, the sender device transitions to a mode in which it assists the sender in the process of composing the voice message. The sender can also speak the name or phone number of the intended recipient in order to provide the address for the voice message.

As the sender device is activated and as the voice message is composed and sent, the sender device can output tones or verbal cues to guide the user through the process of creating and sending the voice message and to verify that the message is being composed and sent as intended. In order to transmit the voice message after it is created, the sender again presses a button on the sender device 102. In other embodiments, either or both of the user inputs associated with depressing a button on the sender device 102 can be replaced with verbal commands. In another embodiment the message can be automatically transmitted unless the sender specifically intervenes to stop transmission within a certain period of time after the message is created. This streamlined process of creating a voice message with minimal manipulation of the sender device is particularly useful in settings in which handling the sender device is difficult, such as when the sender is driving a car. Again, however, it is noted that the use of SMS notifications to indicate the delivery of voice messages to recipients can be practiced regardless of the procedure by which the sender uses the sender device to create the message.

The voice message is sent to the message server 106 after the voice message is created at the sender device 102. As shown in FIG. 3, the sender device 102 determines in decision block 304 whether a network connection is currently present. For instance, the sender device 102 determines whether it is in range of a cellular base station. If the network connection is not present, the method advances to step 306, in which the voice message is stored locally on the sender device until such time that it is determined that a network connection is available.

When the network connection is available, the voice message is sent to the message server 106 in step 308. As noted above, the voice messages of the invention can be delivered to SMS-enabled recipient wireless stations 104 regardless of the other communication capabilities of the recipient wireless stations. The "other communication capabilities" that are referred to herein relate to the ability of the recipient wireless devices to directly receive voice messages using specific protocols or using particular networks or network service providers. For instance, voice messages can be delivered to SMS-enabled recipient wireless stations according to the invention without requiring the recipient wireless stations to be compatible with MMS messaging or other dedicated protocols that can natively support direct voice messaging.

Although the SMS-enabled recipient wireless devices 104 are not required to support MMS or other such messaging protocols, the methods of the invention can be adapted to take advantage of such messaging protocols if they are available. Otherwise, message server 106 of FIG. 1 delivers the voice message to an IVR voice server 110 of an IVR system in step 310 in preparation for instructing recipient wireless device 104 to access the voice message from the IVR voice server. The message is stored in the IVR voice server 110 along with information identifying the recipient, including a Mobile Directory Number (MDN) associated with the wireless station of the recipient. The IVR voice server 110 can the use the MDN to authenticate the recipient when an attempt is made to retrieve the stored voice message as will be described in greater detail below. IVR voice server 110 and the associated IVR system can be adapted from conventional IVR voice servers and systems to perform the operations disclosed herein. Those of skill in the art, upon learning of the invention disclosed herein, will understand the necessary operational details of IVR voice server 110 and the associated IVR system.

In step 312 of FIG. 3, the message server 106 directs an SMS controller or gateway to generate and send an SMS message, or notification, regarding the fact that a voice message for the recipient wireless device 104 has been stored in IVR voice server 110. In the embodiment of FIG. 1, the message server 106 uses an SMS blade 112 that interfaces with the appropriate SMS message generation mechanism 114a–d. The SMS blade 112 can be incorporated into message server 106 or can be implemented in a device that interfaces with the message server. The SMS blade 112 can use hardware, software, firmware, or a combination thereof to interface with the appropriate SMS generation mechanism 114a–d and to perform the other operations that are described in detail below in reference to FIG. 2.

In order to inform recipient wireless station 104 of the stored voice message in IVR voice server 110, the appropriate SMS message generation mechanism 114a–d is used to create the SMS notification for the recipient wireless station. As shown in FIG. 1, the SMS message generation mechanisms include a native SMS gateway 114a that uses TCP/IP, a web SMS gateway 114b that uses HTTP, an SMS controller that uses the Short Message Peer to Peer Protocol 114c (SMPP), and proprietary message systems 114d. SMS blade 112 includes SMS interfaces 116 that communicate with the corresponding SMS message generation mechanisms 114a–d using the appropriate protocol. The appropriate SMS message generation mechanism 114 that is used to create and send the SMS message or notification to recipient wireless station 104 is the SMS message generation mechanism that is capable of sending an SMS message to the recipient wireless station. The message server directs the SMS controller or gateway to generate and send the SMS message by identifying the designated recipient using the MDN associated with the recipient.

If the message server 106 is not yet aware of which SMS message generation mechanism 114a–d, if any, is capable of sending SMS messages to the recipient, the message server, in step 314, polls the SMS controller or gateway for an MDN acknowledgment, which verifies that the particular SMS controller or gateway recognizes the recipient and can send the SMS message to the recipient wireless station. If, according to decision block 316, the message server 106 receives the recipient MDN acknowledgment from a particular SMS controller or gateway, the message server logs this fact in database 120 in step 318 and can use this information to route future messages. More details regarding steps 314, 316 and 318 are described below in reference to FIG. 2.

The SMS message that is sent by the appropriate message generation mechanism 114 is transmitted by wireless network 118 to recipient wireless station 104. Wireless network 118 is the wireless network in which recipient wireless station 104 operates and can be the same as, or different from, wireless network 108 associated with the sender device. Indeed, one of the benefits of the invention is that voice messages can be delivered to recipient wireless station 104 even if the recipient wireless station operates in a different network or uses a different network service provider compared to those associated with sender device 102.

The SMS message notifies recipient wireless station 104 that a voice message is stored in IVR voice server 110 and is waiting to be accessed and includes instructions for enabling the recipient wireless device to access the voice message. The instructions can include the telephone number of the IVR voice server 110 and, optionally, an explanation of the way in which the voice message can be retrieved. The SMS message can also include other information, such as the identity and location of the sender or information describing the subject of the voice message.

Figure 4:
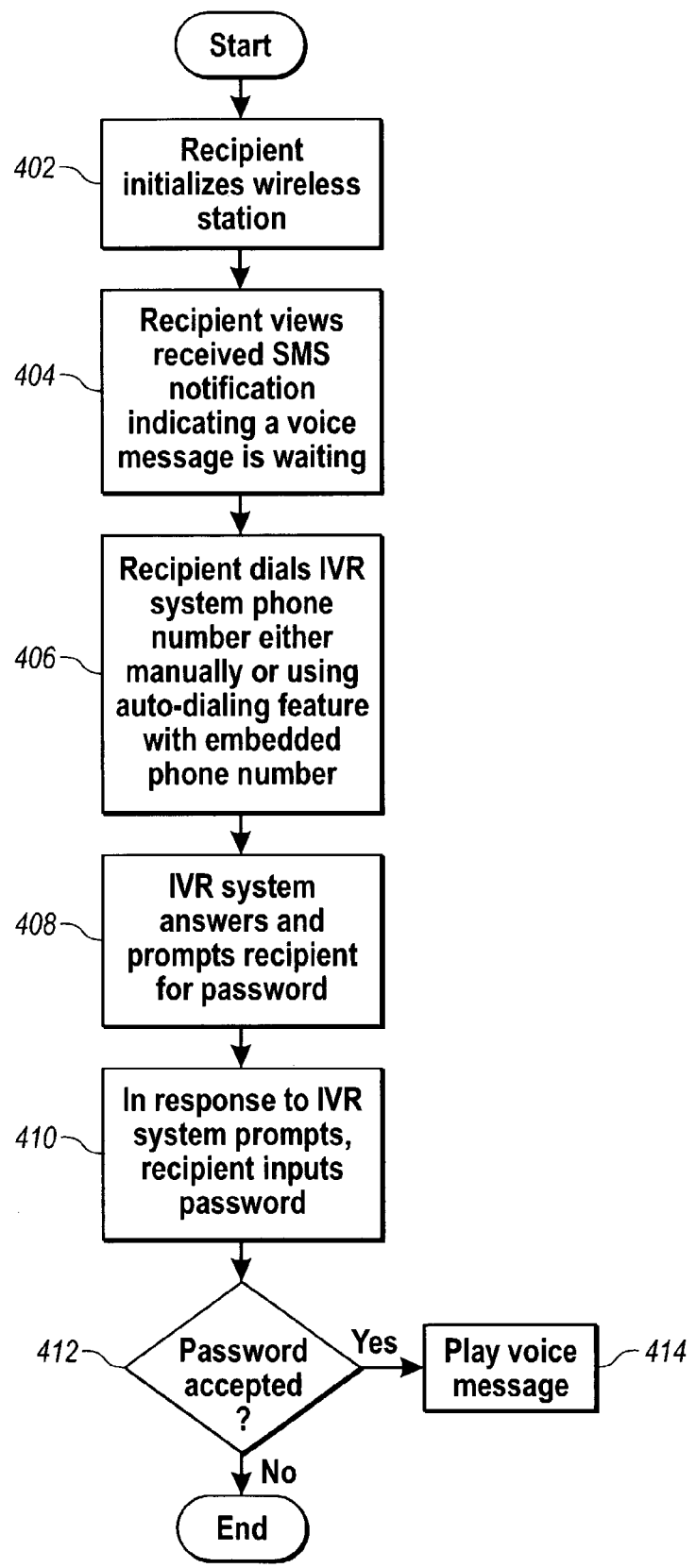
FIG. 4 is a flow diagram illustrating a method of the invention by which a recipient accesses a voice message in response to receiving an SMS notification.

An embodiment of the methods for accessing the stored voice message is now described in reference to FIGS. 1 and 4. In step 402, the recipient wireless station is initiated by the recipient. The recipient then views the received SMS notification in step 404 and learns that a voice message is stored and is waiting to be accessed. In step 406, the recipient dials the IVR voice server 110 either manually or using an automatic dialing feature that executes the telephone number of the IVR voice server embedded in the SMS notification.

The IVR voice server 110 then answers the telephone call from the recipient in step 408 and prompts the recipient to enter a password that can authenticate the recipient. If the recipient has not previously accessed the IVR voice server 110 to retrieve voice messages, the recipient first creates a password that can be used to retrieve future messages. In the case of a first-time recipient, the IVR voice server generally requires a way to recognize or determine whether the party who claims to be the recipient is in fact the recipient designated by the sender. One technique for doing so requires the apparent recipient to place the first telephone call from the recipient's primary wireless station 104 that has an MDN that matches the MDN corresponding to the recipient that the IVR voice server 110 has previously received and linked to the voice message. If the apparent recipient places a telephone call that has the matching MDN associated with the recipient wireless station 104, the IVR voice server 110 concludes that the apparent recipient is the actual recipient. The recipient is then prompted to create a personal identification number or another password. This password is stored at the IVR voice server 110 and, when the recipient attempts to access future voice messages, the recipient can do so from any telephony device so long as the recipient can produce the correct password.

In response to the prompt of step 408, the recipient enters the password according to step 410. If, according to decision block 412, the password is accepted, the voice message is played by the IVR voice server 110 in step 414 and is thereby accessed by the recipient. The IVR voice server 110 can then also enable the recipient to process the voice message in any of a variety of ways, including replaying, deleting, storing, forwarding, skipping, etc.

When a voice message is created and addressed to the recipient, the message server 106 and the associated SMS blade 112 operate to determine whether the designated recipient uses an SMS-enabled wireless station and whether the voice message can be delivered to the recipient. An embodiment of this method is now described in reference to FIGS. 1 and 2, which expands on the information described above in reference to steps 314, 316 and 318 of FIG. 3. According to the method of FIG. 2, the message server or the SMS blade attempts to determine if a telephone number associated with the designated recipient is able to receive an SMS message. At block 202, an MDN that identifies the recipient's wireless station is obtained. The SMS blade 112 includes a SMSable database 120, which is a database that includes information specifying whether the designated recipient has an SMS-enabled wireless station, whether the designated recipient does not have an SMS-enabled wireless station or whether it is not yet determined whether the recipient has an SMS-enabled wireless station. The database 120 can be linked to or can include a contact or address list maintained by the sender. In decision block 204, the database 120 is accessed to determine whether the database includes information relating to whether the recipient has an SMS-enabled wireless device.

If, according to decision block 204, it is determined that the recipient wireless device is SMS-enabled, the appropriate SMS message generation mechanism 114a–d, as specified by database 120, is used to create and send the SMS notification. If the database 120 indicates that the designated recipient does not have an SMS-enabled wireless station, the voice message is undeliverable using the SMS notification technique and an error message can be returned to the sender. If, however, the database 120 does not specify whether the recipient has an SMS-enabled wireless station, the method then advances to step 206, in which SMS interface routing logic 122 of FIG. 1 is used to initiate a trial and error routine in which attempts are made to send SMS notifications to the recipient.

Figure 2:
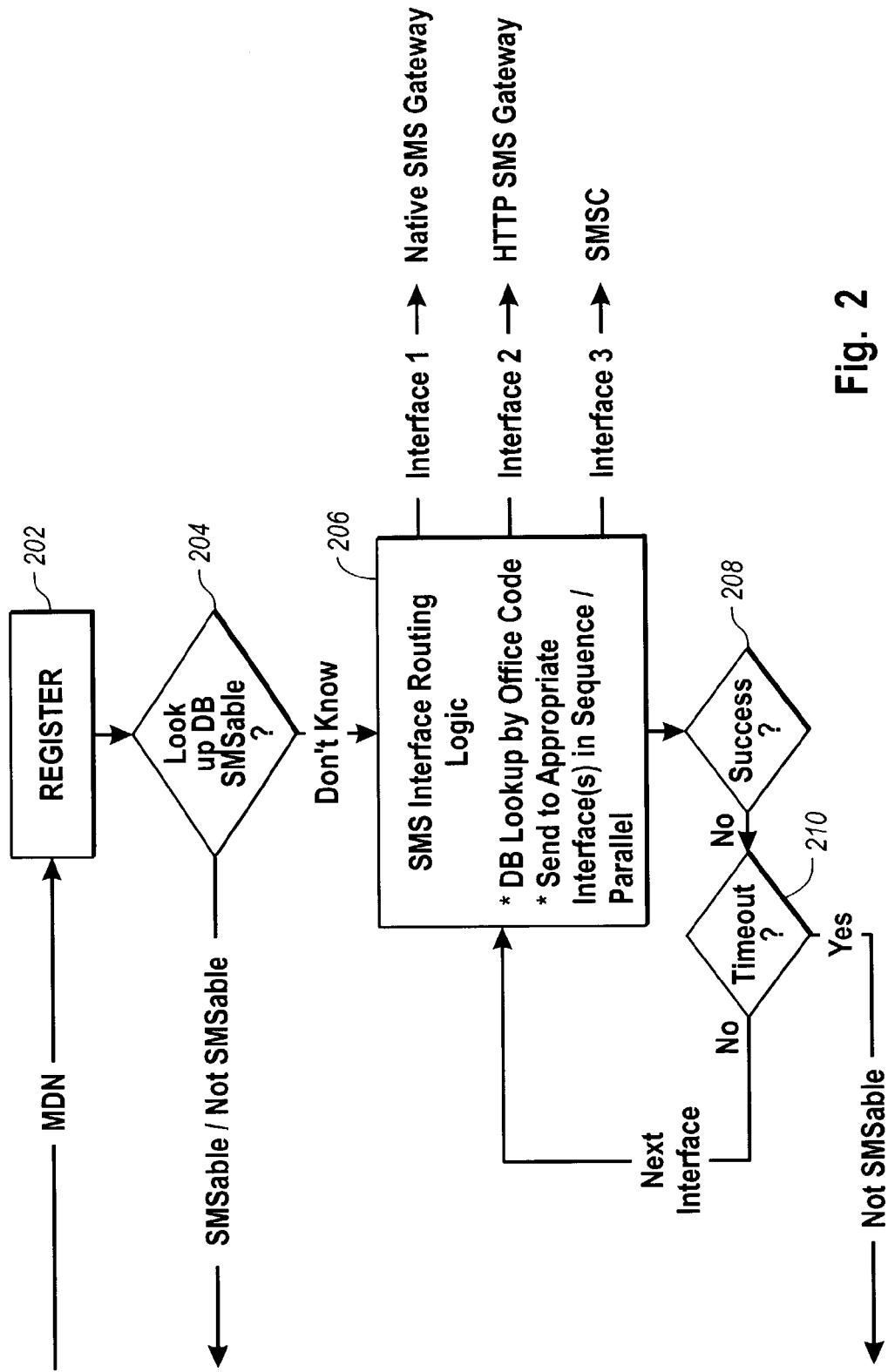
FIG. 2 is a flow diagram illustrating a method by which an SMS blade determines whether delivery of a voice message to a designated recipient is possible and, if so, initiates delivery of the voice message.

As shown in FIG. 2, the attempts to send SMS notifications can be made by using the SMS interfaces 116 and the corresponding SMS mechanisms 114a–d in parallel or in sequence. In response to an attempt with each of the SMS mechanisms 114a–d, it is determined in decision block 208 whether the attempt to send an SMS notification has been successful. With each attempt, the message server 106 monitors the SMS controller or SMS gateway for an indication that the target recipient telephone number has been recognized and accepted. If so, the recipient wireless station is determined to be SMS-enabled and the notification of the voice message stored in IVR voice server 110 can be delivered to the recipient wireless station. In addition, if the attempt is successful, the database 120 is updated to indicate that the recipient wireless station is SMS-enabled and to specify the appropriate SMS mechanism 114*a–d* to use in response to receiving future voice messages.

If the attempt is unsuccessful in decision block 208, the method proceeds to decision 210 in which it is determined whether sufficient time has elapsed without a successful SMS notification delivery to conclude that the recipient does not have an SMS-enabled wireless station. If this is the case, the database is updated to indicate the lack of an SMS-enabled wireless station and an error message can be returned to the sender.

Checking the various interfaces for the ability to send an SMS message to a particular recipient can occur in response to a sender addressing and initiating delivery of a voice message to the recipient. This process can also take place in the background without being initiated by a particular voice message that is to be delivered to the recipient and without a subsequent action of sending an SMS message to the recipient. For example, the checking process can be performed in the background when sender inputs a new phone number into the sender's contact list, even if sender has not attempted to send any messages to that phone number.

In the foregoing manner, voice messages can be created on a sender device, sent over a wireless network, and accessed by any new or legacy wireless station, regardless of the type of network, subscriber or member status, or type of sending device or receiving wireless device, so long as the receiving wireless device supports the SMS protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a wireless communication system, a method of initiating delivery of a voice message to a recipient wireless station, comprising:
   receiving an instant voice message at a message server from a sender device, the voice message designating a recipient;
   storing the instant voice message in an interactive voice response (IVR) system associated with the message server;
   determining whether a recipient wireless station associated with the designated recipient is enabled for Short Message Service (SMS) messages;
   initiating transmission of a Short Message Service (SMS) notification to the recipient wireless station, the SMS notification including information permitting the recipient wireless station to access the IVR system; and
   in response to the IVR system receiving a request for the stored instant voice message, transmitting the stored instant voice message from the IVR system to the recipient wireless station.

2. The method of claim 1, wherein the information permitting the recipient wireless station to access the IVR system comprises a telephone number associated with the IVR system.

3. The method of claim 2, wherein the information permitting the recipient wireless station to access the IVR system further comprises an identifier associated with the instant voice message stored in the IVR system.

4. The method of claim 1, wherein initiating transmission of the SMS message comprises polling an SMS message generation mechanism for an acknowledgment of recognition of an MDN associated with the recipient wireless device.

5. The method of claim 1, wherein the instant voice message is received by a message server in the wireless network, the method further comprising sending the instant voice message from the message server to the IVR system for storage.

6. The method of claim 5, further comprising the message server directing an SMS controller in the wireless network to initiate the transmission of the SMS notification.

7. The method of claim 5, further comprising the message server directing a gateway to instruct an SMS controller in the wireless network to initiate the transmission of the SMS notification.

8. The method of claim 5, further comprising the IVR system directing an SMS controller or gateway in the wireless network to initiate the transmission of the SMS notification.

9. The method of claim 1, wherein:
   storing the message in an IVR system comprises storing a Mobile Directory Number (MDN) in the IVR system, the MDN identifying the recipient wireless station; and
   the method further comprises:
     receiving the request for the stored instant voice message; and
     authenticating the recipient using at least one of an MDN encoded in a telephone call from the recipient and a password provided by the recipient.

10. The method of claim 1, further comprising:
    receiving a second instant voice message from the sender device, the second instant voice message designating a different, second recipient; and
    in response to determining that a second recipient wireless station associated with the second recipient is capable of directly receiving the second instant voice message, directly transmitting the second instant voice message to the second recipient wireless station without transmitting the second instant voice message to an interactive voice response system.

11. The method of claim 1, wherein the SMS notification further includes information identifying the sender of the instant voice message.

12. The method of claim 1, wherein the SMS notification further includes information describing a subject of the instant voice message.

13. The method of claim 1, wherein the instant voice message is created by the sender without requiring the sender to first attempt to establish a live telephone call with the recipient.

14. The method of claim 1, wherein initiating transmission of the SMS notification and transmitting the stored instant voice message from the IVR system to the recipient wireless station are conducted without requiring the recipient wireless station to have any particular communication capabilities for receiving voice messages other than being SMS-enabled.

15. The method of claim 1, wherein initiating transmission of the SMS notification and transmitting the stored instant voice message from the IVR system to the recipient wireless station are conducted without requiring the recipient wireless station to operate on the same wireless network as the sender device.

16. In a server of a wireless network, a method of initiating delivery of an instant voice message to a recipient wireless station, comprising:
   in response to an instant voice message addressed to a designated recipient being stored in an interactive voice response (IVR) system, determining whether a database associated with the server indicates whether a recipient wireless station associated with the designated recipient is enabled for Short Message Service (SMS) messages;
   if it is determined that the database indicates that the recipient wireless station is enabled for SMS messages, transmitting an SMS message to the recipient wireless station, the SMS message including instructions for accessing the instant voice message stored in the IVR system; and
   if it is determined that the database does not indicate whether the recipient wireless station is enabled for SMS messages:
      communicating with one or more interfaces to determine whether the recipient wireless station is capable of receiving SMS messages from any of the one or more interfaces; and
      if it is determined that the recipient wireless station is capable of receiving SMS messages from one of the one or more interfaces, transmitting an SMS message to the recipient from said one of the one or more interfaces, the SMS message including instructions for accessing the instant voice message stored in the IVR system.

17. The method of claim 16, wherein:
   the one or more interfaces includes at least two interfaces; and
   communicating with the one or more interfaces comprises communicating with the at least two interfaces in parallel.

18. The method of claim 16, wherein:
   the one or more interfaces includes at least two interfaces; and
   communicating with the one or more interfaces comprises communicating with the at least two interfaces in sequence.

19. The method of claim 16, wherein the one or more interfaces includes a native SMS gateway, a HyperText Transfer Protocol (HTTP) SMS gateway and a SMS controller.

20. The method of claim 16, further comprising, if it is determined that the database indicates that the recipient wireless station is not enabled for SMS messages, transmitting an error message to a sender device associated with a sender of the instant voice message.

21. The method of claim 16, further comprising, if it is determined that the database does not indicate whether the recipient wireless station is enabled for SMS messages, updating the database to indicate whether the recipient wireless station is enabled for SMS messages after communicating with one or more interfaces.

22. In a wireless station that operates in a wireless network, a method of accessing an instant voice message, comprising:
   receiving a Short Message Service (SMS) message that includes instructions for accessing an instant voice message stored in an interactive voice response (IVR) system, wherein the instant voice message is associated with a first mobile directory number that is provided by a sender of the instant voice message;
   in response to the performance of the instructions, accessing the IVR system;
   providing a second mobile directory number to the IVR system from a recipient wireless station; and
   using the IVR system, accessing the instant voice message stored in the IVR system if the second mobile directory number is the same as the first mobile directory number.

23. The method of claim 22, wherein the instructions comprise a telephone number of the IVR system.

24. The method of claim 22, wherein accessing the IVR system comprises receiving input from a user of the wireless station who has manually entered the telephone number into the wireless station.

25. The method of claim 22, wherein accessing the IVR system is performed in response to the wireless station automatically dialing the telephone number.

26. The method of claim 22, wherein using the IVR system comprises transmitting information that allows the IVR system to authenticate the wireless station.

27. The method of claim 22, wherein the information that allows the IVR system to authenticate the wireless station comprises a password.

28. The method of claim 23, wherein the password has been selected by a recipient who uses the wireless station when the recipient previously accessed another instant voice message from the IVR system.

29. The method of claim 22, wherein the information that allows the IVR to authenticate the wireless station comprises a Mobile Directory Number (MDN) associated with the wireless station, the IVR system having a copy of the MDN, thereby permitting the IVR system to authenticate the wireless station.

30. The method of claim 22, wherein using the IVR system, accessing the instant voice message stored in the IVR system if the second mobile directory number is the same as the first mobile directory number further comprises at least one of:
   enabling the recipient to establish a password for future instant voice messages; or
   accessing the instant voice message stored in the IVR system using the password and without requiring the first mobile directory number to be the same as the second mobile directory number if the recipient has previously established a password.

31. In a wireless network in which a sender can initiate delivery of instant voice messages to recipients, a method for determining whether an instant voice message can be sent to a potential new recipient, comprising:
   receiving input from a sender identifying a potential new recipient;
   in response to the input, determining whether SMS messages can be sent to the recipient by:
      communicating to one or more interfaces to determine whether the potential new recipient has a recipient wireless station with a capability of receiving SMS messages from any of the one or more interfaces; and
      if it is determined that the recipient has the recipient wireless station with the capability of receiving SMS messages from any of the one or more interfaces, updating a database in the wireless network indicating said capability of the recipient wireless station.

32. The method of claim 31, wherein the input comprises the sender adding the potential new recipient to a contact list.

33. The method of claim 31, wherein the input comprises the sender requesting delivery of a voice message to the potential new recipient.

34. The method of claim 31, wherein communicating to one or more interfaces comprises sending to the one or more interfaces a Mobile Directory Number (MDN) identifying the recipient wireless station.

35. In a wireless communication system, a method for delivering an instant voice message to a recipient wireless station, the method comprising:

receiving an instant voice message at a message server that designates a recipient, wherein the instant voice message is created at a sender device without placing a call to the recipient;

storing, by the message server, the instant voice message at an interactive voice response system, wherein the interactive voice response system is not a voicemail system associated with the recipient;

transmitting a Short Message Service (SMS) message to the recipient wireless station, the SMS message including information enabling the recipient to access the interactive voice response system; and transmitting the stored instant voice message from the interactive voice response system to the recipient upon authenticating a request for the stored instant voice message from the recipient.

* * * * *